United States Patent [19]

Fukuda et al.

[11] Patent Number: 5,827,792

[45] Date of Patent: Oct. 27, 1998

[54] DIELECTRIC CERAMIC COMPOSITION

[75] Inventors: Koichi Fukuda; Masataka Fujinaga; Atsuyuki Mitani; Masatoshi Takeda; Shinichi Ishitobi, all of Yamaguchi, Japan

[73] Assignee: UBE Industries, Ltd., Ube, Japan

[21] Appl. No.: 520,580

[22] Filed: Aug. 29, 1995

[30] Foreign Application Priority Data

| Aug. 30, 1994 | [JP] | Japan | 6-205326 |
| Dec. 12, 1994 | [JP] | Japan | 6-307357 |
| Dec. 12, 1994 | [JP] | Japan | 6-307358 |
| Dec. 13, 1994 | [JP] | Japan | 6-308805 |

[51] Int. Cl.$^6$ .................................................. C04B 35/46
[52] U.S. Cl. ......................... 501/138; 501/139; 501/32
[58] Field of Search ............................ 501/138, 139, 501/32

[56] References Cited

U.S. PATENT DOCUMENTS

| 5,077,247 | 12/1991 | Sato et al. | 501/139 |
| 5,185,304 | 2/1993 | Hirai et al. | 501/139 |
| 5,244,851 | 9/1993 | Takahashi et al. | 501/139 |
| 5,256,639 | 10/1993 | Fujimaru et al. | 501/139 |
| 5,292,694 | 3/1994 | Abe et al. | 501/139 |
| 5,350,721 | 9/1994 | Abe et al. | 501/139 |
| 5,376,603 | 12/1994 | Hirahara et al. | 501/138 |

FOREIGN PATENT DOCUMENTS

| 0174806 | 10/1982 | Japan | 501/139 |
| 60-35406 | 2/1985 | Japan . | |
| 62-72558 | 3/1987 | Japan . | |
| 402049307 | 2/1990 | Japan | 501/139 |
| 404274109 | 9/1992 | Japan | 501/139 |
| 404359806 | 12/1992 | Japan | 501/139 |

OTHER PUBLICATIONS

*Ceramic and dielectric properties of Selected Compositions in the* $BaO-TiO_2-Nd_2O_3$ *System*, Kolar et al, 1978.

Primary Examiner—Deborah Jones
Attorney, Agent, or Firm—Kane,Dalsimer,Sullivan et al.

[57] ABSTRACT

A dielectric ceramic composition mainly comprises a major component which comprises barium, titanium, neodymium, samarium and oxygen and is represented by the following compositional formula:

$$xBaO\text{-}yTiO_2\text{-}zNd_2O_3\text{-}tSm_2O_3$$

wherein $0.1 \leq x \leq 0.2$; $0.5 \leq y \leq 0.8$; $0.01 \leq z \leq 0.2$; $0 \leq t \leq 0.2$, provided that $x+y+z+t=1$); and a minor component mainly comprising glass powder having a softening point of about 100° to about 500° C., which mainly comprises PbO, ZnO and $B_2O_3$, and $GeO_2$, and wherein the content (a) (% by weight) of the glass powder falls within the range of $1 \leq a \leq 25$ and the content (b) (% by weight) of $GeO_2$ falls within the range of $0.5 \leq b \leq 10$, on the basis of the weight of the major component. The major component may further comprise $Bi_2O_3$ and the composition may comprise bismuth as a minor component. The dielectric ceramic composition can be sintered at a low temperature and exhibits excellent characteristic properties such that it has a large specific dielectric constant $\epsilon_r$, a large unloaded Q and a small temperature coefficient of the resonance frequency.

18 Claims, No Drawings

DIELECTRIC CERAMIC COMPOSITION

BACKGROUND OF THE INVENTION

1. Field of the Invention

The present invention relates to a dielectric ceramic composition suitably used as a material for a dielectric resonator or the like.

2. Disclosure of the Prior Art

There has recently been desired for the development of a small-sized and high performance dielectric resonator as integration of microwave circuits is increased. The dielectric ceramic composition used in such dielectric resonators must satisfy various requirements. For instance, the composition should have a large specific dielectric constant $\epsilon_r$, a large unloaded Q and a low temperature coefficient of resonance frequency $\tau_f$.

As examples of such dielectric ceramic compositions, Ber. Dt. Keram. Ges., 55 (1978), Nr. 7 and JPA No. Sho 60-35406 propose dielectric ceramic compositions comprising $BaO-TiO_2-Nd_2O_3$ systems. Moreover, U.S. Pat. No. 5,292,694 discloses a dielectric ceramic composition comprising a $BaO-TiO_2-RE_2O_3$ system (wherein "RE" represents a rare earth metal). In addition, JPA No. Sho 62-72558 discloses a dielectric ceramic composition comprising a $BaO-TiO_2-Nd_2O_3-Bi_2O_3$ system.

There have recently been developed a laminated chip condenser and a laminated dielectric resonator, which are prepared by laminating a dielectric ceramic composition. In this respect, the ceramic composition and the internal electrode have been laminated by simultaneous firing. However, it is difficult to simultaneously firing the foregoing dielectric ceramic composition and the internal electrode, since the firing temperature of the former is high on the order of 1300° to 1400° C. and therefore, electrode materials for producing laminated structures are limited to those which are proof against a high temperature such as palladium (Pd) and platinum (Pt). For this reason, there has long been desired for the development of a dielectric ceramic composition capable of being fired simultaneously with cheaper electrode materials such as silver (Ag), silver-palladium (Ag-Pd) and copper (Cu), at a low temperature of not higher than 1200° C.

SUMMARY OF THE INVENTION

Accordingly, it is an object of the present invention to provide a dielectric ceramic composition which has excellent properties as a material for dielectric resonators or the like, in particular, a high dielectric constant, a high unloaded Q and low temperature-dependency of the resonance frequency and which exhibits good sinterability even if it is fired at a low temperature.

According to an aspect of the present invention, there is provided a dielectric ceramic composition which mainly comprises a major component comprising barium, titanium, neodymium, samarium and oxygen and represented by the following compositional formula:

$$xBaO\text{-}yTiO_2\text{-}zNd_2O_3\text{-}tSm_2O_3 \quad (1)$$

(wherein $0.1 \leq x \leq 0.2$; $0.5 \leq y \leq 0.8$; $0.01 \leq z \leq 0.2$; $0 \leq t \leq 0.2$, provided that $x+y+z+t=1$); and a minor component mainly comprising glass powder, which mainly comprises PbO, ZnO and $B_2O_3$, and $GeO_2$, and wherein the content (a) (% by weight) of the glass powder falls within the range of $1 \leq a \leq 25$ and the content (b) (% by weight) of $GeO_2$ falls within the range of $0.5 \leq b \leq 10$, on the basis of the weight of the major component.

According to another aspect of the present invention, there is provided a dielectric ceramic composition mainly comprising a major component which comprises barium, titanium, neodymium, samarium, bismuth and oxygen and is represented by the following compositional formula:

$$xBaO\text{-}yTiO_2\text{-}zNd_2O_3\text{-}tSm_2O_3\text{-}wBi_2O_3 \quad (2)$$

(wherein $0.1 \leq x \leq 0.2$; $0.5 \leq y \leq 0.8$; $0.01 \leq z \leq 0.2$; $0.01 \leq t \leq 0.2$; $0.005 \leq w \leq 0.05$, provided that $x+y+z+t+w=1$); and a minor component mainly comprising glass powder, which mainly comprises PbO, ZnO and $B_2O_3$, and $GeO_2$, and wherein the content (a) (% by weight) of the glass powder falls within the range of $1 \leq a \leq 25$ and the content (b) (% by weight) of $GeO_2$ falls within the range of $0.5 \leq b \leq 10$, on the basis of the weight of the major component.

The dielectric ceramic composition of the present invention may further comprise $Li_2O$ as a minor component and the content (c) (% by weight) of $Li_2O$ falls within the range of $0.04 \leq c \leq 4$ on the basis of the weight of the major component.

The dielectric ceramic composition may also contain $Nb_2O_5$, MnO, $Al_2O_3$ and/or ZnO.

In the ceramic composition of this invention, the content of PbO, ZnO and $B_2O_3$ in the glass powder are preferably in the range of $5 \leq PbO \leq 90$, $5 \leq B_2O_3 \leq 60$, and $0 < ZnO \leq 65$, more preferably $0 < ZnO \leq 50$ (% by weight).

If the softening point of the glass powder is higher than about 500° C., it becomes difficult to fire at a low temperature. Although there is no limitation on the lower limit of the softening point of the glass powder, it is usually about 100° C.

It has been found that the dielectric ceramic composition of this invention has excellent characteristic properties such that it can be sintered at a low temperature and that it has a high dielectric constant, a large unloaded Q and low temperature-dependency of the resonance frequency.

The present invention is also provides a dielectric device such as a dielectric resonator and a dielectric filter, comprising the dielectric ceramic composition as above.

DETAILED DESCRIPTION OF THE INVENTION

First, the relative amounts of the oxides constituting the major component of the dielectric ceramic composition according to the present invention will be explained below. If the molar fraction of BaO exceeds the foregoing upper limit, the dielectric resonator produced from the resulting dielectric ceramic composition does not undergo any resonance. On the other hand, if it is less than the lower limit, the resulting dielectric resonator exhibits a low dielectric constant and a low unloaded Q.

If the molar fraction of $TiO_2$ is greater than the upper limit defined above, the resulting dielectric resonator shows a large temperature coefficient of the resonance frequency, while if it is less than the lower limit, the dielectric constant of the resulting resonator is low. Moreover, if the molar fraction of $Nd_2O_3$ is greater than the upper limit defined above, the resulting dielectric resonator exhibits a low dielectric constant and a low unloaded Q, while if it is less than the lower limit, the temperature coefficient of the resonance frequency observed for the resulting dielectric resonator has a tendency to increase. In addition, the molar fraction of $Sm_2O_3$ has an effect on the dielectric constant, the unloaded Q and the temperature coefficient of the resonance frequency of the resulting dielectric resonator and therefore, a dielectric resonator exhibiting the desired characteristic properties can be produced only when it falls within the range defined above.

In the present invention, if the content of the minor component relative to the major component, i.e., the content (a) (% by weight) of the glass powder which mainly comprises PbO, ZnO and $B_2O_3$ and the content (b) (% by weight) of $GeO_2$ are extremely high, the unloaded Q of the resulting dielectric resonator is reduced, while these contents (a) and (b) are too low or zero, it becomes difficult to fire the resulting composition at a low temperature of not higher than 1200° C. For this reason, the content of the minor component relative to the major component, i.e., the content (a) (% by weight) of the glass powder which mainly comprises PbO, ZnO and $B_2O_3$ and the content (b) (% by weight) of $GeO_2$ are limited to the foregoing ranges, respectively. Moreover, the relative proportions of PbO, ZnO and $B_2O_3$ which constitute the glass powder are not particularly restricted, but if the content of ZnO is too high, the softening point of the resulting glass increases and it is difficult to fire the resulting composition at a low temperature. Accordingly, the content of ZnO in the glass powder is preferably $0 < ZnO \leq 65$, more preferably $0 < ZnO \leq 50$. The content of PbO and $B_2O_3$ falls preferably within $5 \leq PbO \leq 90$ and $5 \leq B_2O_3 \leq 60$ (% by weight), respectively.

And, if the softening point of the minor comonent, glass powder, is higher than about 500° C., it becomes difficult to fire at a low temperature.

The dielectric ceramic composition of the present invention may further comprise, as a minor component, $Li_2O$ such that the content (c) (% by weight) thereof falls within the range of $0.04 \leq c \leq 4$. The addition of $Li_2O$ permits a further decrease of the sintering temperature of the composition and as a result, an internal electrode of Ag can easily be formed. If the content (c) of $Li_2O$ exceeds the upper limit defined above, the dielectric resonator produced from the resulting dielectric ceramic composition never undergoes resonance.

According to a second aspect of the present invention, there is further provided a dielectric ceramic composition which mainly comprises a major component comprising barium, titanium, neodymium, samarium, bismuth and oxygen and represented by the following compositional formula:

$$xBaO\text{-}yTiO_2\text{-}zNd_2O_3\text{-}tSm_2O_3\text{-}wBi_2O_3 \quad (2)$$

(wherein $0.1 \leq x \leq 0.2$; $0.5 \leq y \leq 0.8$; $0.01 \leq z \leq 0.2$; $0.01 \leq t \leq 0.2$; $0.005 \leq w \leq 0.05$, provided that $x+y+z+t+w=1$); and a minor component mainly comprising glass powder, which mainly comprises PbO, ZnO and $B_2O_3$, and $GeO_2$, and wherein the content (a) (% by weight) of the glass powder falls within the range of $1 \leq a \leq 25$ and the content (b) (% by weight) of $GeO_2$ falls within the range of $0.5 \leq b \leq 10$, on the basis of the weight of the major component.

If the softening point of the minor comonent, glass powder is higher than about 500° C., it becomes difficult to fire at a low temperature.

In this composition, if the molar fraction of $Bi_2O_3$ is excessively high, the resulting composition exhibits a low dielectric constant and a low unloaded Q, while if it is extremely low, the dielectric resonator produced from the resulting composition has a high temperature coefficient of the resonance frequency. In the foregoing formula (2), the proportions of x, y, z and t as well as the contents (a) and (b) of the glass powder and $GeO_2$ as the minor component are limited to the foregoing ranges respectively, for the same reasons discussed above in connection with the foregoing formula (1).

This dielectric ceramic composition has excellent characteristic properties like the foregoing composition according to the first aspect such that it can also be sintered at a low temperature and that it has a high dielectric constant, a large unloaded Q and low temperature-dependency of the resonance frequency.

The dielectric ceramic composition according to the second aspect of the present invention may further comprise, as a minor component, $Li_2O$ such that the content (c) (% by weight) thereof falls within the range of $0.04 \leq c \leq 4$. In this case, the addition of $Li_2O$ likewise permits a further decrease of the sintering temperature of the composition and as a result, an internal electrode of Ag can easily be formed. If the content (c) of $Li_2O$ exceeds the upper limit defined above, the dielectric resonator produced from the resulting dielectric ceramic composition never undergoes resonance.

In the present invention (the first and second aspects), at least one member selected from the group consisting of $Nb_2O_5$, MnO, $Al_2O_3$ and ZnO may be added to the composition as the third component and this permits a further reduction in the absolute value of the temperature coefficient $\tau_f$ of the resonance frequency. If the content d (% by weight) of the third component on the basis of the major component is extremely high, the temperature coefficient $\tau_f$ of the resonance frequency increases. Therefore, the content (d) thereof falls within the range of $0 \leq d \leq 2$, preferably $0.1 \leq d \leq 2$.

Then a preferred method for preparing the dielectric ceramic composition of the present invention will be described below.

A starting material comprising various oxides constituting the major component, for instance, barium carbonate, titanium oxide, neodymium oxide, samarium oxide and, if necessary, bismuth oxide is subjected to wet blending in predetermined portions together with a solvent such as water or an alcohol. Subsequently, the solvent such as the water or the alcohol was removed, followed by pulverization of the mixture and then calcination thereof at a temperature ranging from 1000° to 1300° C. for about 1 to 5 hours in an oxygen-containing gas atmosphere (for instance, in the air). The calcined powder thus prepared is wet-blended with the minor component, i.e., the glass powder which is composed of PbO, ZnO and $B_2O_3$ and $GeO_2$, and if necessary, $Li_2O$ and the third component, i.e., at least one member selected from the group consisting of $Nb_2O_5$, MnO, $Al_2O_3$ and ZnO in the presence of a solvent such as an alcohol. Then the solvent such as the water or the alcohol is removed and thereafter the mixture is pulverized. Moreover, the product is uniformly mixed with an organic binder such as polyvinyl alcohol, followed by drying, pulverization and pressure molding (under a pressure ranging from about 100 to 1000 kg/cm$^2$). Thereafter, a dielectric ceramic composition represented by the foregoing compositional formula (1) or (2) can be obtained by firing the resulting molded article at a temperature ranging from 850° to 1100° C. in an oxygen-containing gas atmosphere, for instance, in the air.

The dielectric ceramic composition thus prepared may be, according to need, processed into appropriate shapes and sizes, or formed into a sheet by, for instance, the doctor blade technique followed by lamination of the sheet with an electrode and may thus be used as a material for a dielectric resonator, a dielectric substrate, a laminated element or the like.

As raw materials for barium, titanium, neodymium, samarium, niobium, bismuth, lead, zinc, boron, germanium, manganese, aluminum and lithium, there may be used, for instance, nitrates and hydroxides thereof which are converted into oxides during the firing process in addition to oxides thereof such as $BaCO_3$, $TiO_2$, $Nd_2O_3$, $Sm_2O_3$, $Bi_2O_3$, $PbO$, $ZnO$, $B_2O_3$, $GeO_2$, $Nb_2O_5$, $MnO$, $Al_2O_3$ and $LiO_2$ The present invention will hereinafter be described in more detail with reference to the following non-limitative working Examples and Comparative Examples.

EXAMPLE 1

Barium carbonate powder ($BaCO_3$; 0.13 mole), titanium oxide powder ($TiO_2$; 0.70 mole) and neodymium oxide powder ($Nd_2O_3$; 0.17 mole) were charged in a ball mill together with ethanol and then subjected to wet blending for 12 hours.

After the removal of the solvent from the dispersion, the mixture was pulverized and then calcined at 1250° C. in the air. Separately, glass powder A comprising 84wt % of lead oxide powder (PbO), 7 wt % of zinc oxide powder (ZnO) and 9 wt % of boron oxide powder ($B_2O_3$) was prepared according to the usual method. To the calcined product prepared above, there were added 2 wt % of the glass powder A comprising PbO, ZnO and $B_2O_3$, and 3 wt % of germanium oxide powder ($GeO_2$), followed by introduction of the mixture into a ball mill together with ethanol and then wet blending for 48 hours. After the removal of the solvent from the dispersion, the mixture was pulverized, followed by addition of an appropriate amount of a polyvinyl alcohol solution to the pulverized product, drying the mixture, forming it into pellets having a diameter of 12 mm and a thickness of 4 mm and then firing the pellets at 970° C. for 2 hours in the air. The composition of the product and the sintering temperature thereof are summarized in the following Table 1.

The ceramic composition thus prepared was processed into pieces each having a diameter of 7 mm and a thickness of about 3 mm and inspected for the specific dielectric constant $\epsilon_r$, the unloaded Q and the temperature coefficient $\tau_f$ of the resonance frequency at a resonance frequency (ranging from 3 to 6 GHz) according to the dielectric resonance method. The results thus obtained are listed in the following Table 2.

EXAMPLES 2 to 22 AND COMPARATIVE EXAMPLES 1 to 12

The same procedures used in Example 1 were repeated except that the mixing ratio of barium carbonate, titanium oxide, neodymium oxide and samarium oxide; the kinds of glass powder comprising PbO, ZnO and $B_2O_3$ (glass powder B: 80 wt % PbO, 10 wt % ZnO and 10 wt % $B_2O_3$) and the added amounts of the minor components as well as the added amount (d) of the third component were changed as detailed in Table 1 to prepare dielectric ceramic compositions and they were inspected for characteristic properties. The compositions of the products prepared in these Examples and Comparative Examples and characteristic properties thereof are summarized in Table 2.

TABLE 1

| | COMPOSITION OF DIELECTRIC CERAMIC | | | | | | | | CALCINATION |
|---|---|---|---|---|---|---|---|---|---|
| | BaO x | $TiO_2$ y | $Nd_2O_3$ z | $Sm_2O_3$ t | GLASS POWDER wt % | KIND OF GLASS | $GeO_2$ wt % | d wt % | TEMPERATURE °C. |
| EXAMPLE | | | | | | | | | |
| 1 | 0.13 | 0.70 | 0.17 | 0 | 2 | A | 3 | — | 970 |
| 2 | 0.18 | 0.67 | 0.11 | 0.04 | 7 | A | 3 | — | 940 |
| 3 | 0.18 | 0.67 | 0.11 | 0.04 | 10 | A | 3 | — | 915 |
| 4 | 0.18 | 0.67 | 0.11 | 0.04 | 15 | A | 3 | — | 890 |
| 5 | 0.16 | 0.67 | 0.11 | 0.06 | 20 | A | 2 | — | 880 |
| 6 | 0.18 | 0.66 | 0.13 | 0.03 | 5 | B | 5 | — | 990 |
| 7 | 0.17 | 0.67 | 0.10 | 0.06 | 10 | B | 3 | — | 960 |
| 8 | 0.16 | 0.65 | 0.17 | 0.02 | 15 | B | 3 | — | 940 |
| 9 | 0.13 | 0.70 | 0.17 | 0 | 7 | A | 3 | — | 950 |
| 10 | 0.13 | 0.70 | 0.15 | 0.02 | 7 | A | 3 | — | 945 |
| 11 | 0.13 | 0.70 | 0.12 | 0.05 | 7 | A | 3 | — | 950 |
| 12 | 0.14 | 0.71 | 0.04 | 0.11 | 10 | A | 5 | — | 935 |
| 13 | 0.17 | 0.66 | 0.17 | 0 | 10 | A | 5 | — | 925 |
| 14 | 0.17 | 0.66 | 0.17 | 0 | 10 | A | 7 | — | 915 |
| 15 | 0.17 | 0.66 | 0.17 | 0 | 10 | A | 10 | — | 935 |
| 16 | 0.16 | 0.65 | 0.18 | 0.01 | 7 | A | 3 | — | 940 |
| 17 | 0.15 | 0.67 | 0.18 | 0 | 10 | A | 5 | — | 905 |
| 18 | 0.15 | 0.67 | 0.18 | 0 | 15 | A | 3 | — | 875 |
| 19 | 0.15 | 0.67 | 0.18 | 0 | 12 | A | 5 | 0.5 ($Nb_2O_5$) | 910 |
| 20 | 0.15 | 0.67 | 0.18 | 0 | 12 | A | 5 | 0.5 (MnO) | 915 |
| 21 | 0.15 | 0.67 | 0.18 | 0 | 12 | A | 5 | 0.5 ($Al_2O_3$) | 920 |
| 22 | 0.15 | 0.67 | 0.18 | 0 | 12 | A | 5 | 0.5 (ZnO) | 910 |

TABLE 1-continued

| | COMPOSITION OF DIELECTRIC CERAMIC | | | | | | | | |
|---|---|---|---|---|---|---|---|---|---|
| | BaO x | TiO$_2$ y | Nd$_2$O$_3$ z | Sm$_2$O$_3$ t | GLASS POWDER wt % | KIND OF GLASS | GeO$_2$ wt % | d wt % | CALCINATION TEMPERATURE °C. |
| COMPARATIVE EXAMPLE | | | | | | | | | |
| 1 | 0.05 | 0.75 | 0.19 | 0.01 | 10 | A | 5 | — | 960 |
| 2 | 0.30 | 0.57 | 0.11 | 0.02 | 10 | A | 3 | — | 935 |
| 3 | 0.08 | 0.86 | 0.05 | 0.01 | 15 | A | 3 | — | 920 |
| 4 | 0.15 | 0.45 | 0.39 | 0.01 | 9 | A | 2 | — | 930 |
| 5 | 0.11 | 0.57 | 0.31 | 0.01 | 10 | A | 2 | — | 920 |
| 6 | 0.10 | 0.89 | 0 | 0.01 | 10 | A | 2 | — | 925 |
| 7 | 0.14 | 0.55 | 0.01 | 0.30 | 5 | A | 3 | — | 945 |
| 8 | 0.15 | 0.70 | 0.13 | 0.02 | 0 | — | 0 | — | 1420 |
| 9 | 0.16 | 0.67 | 0.11 | 0.06 | 30 | A | 2 | — | 870 |
| 10 | 0.16 | 0.65 | 0.17 | 0.02 | 30 | B | 3 | — | 860 |
| 11 | 0.17 | 0.66 | 0.17 | 0 | 20 | A | 0 | — | 1160 |
| 12 | 0.15 | 0.70 | 0.13 | 0.02 | 10 | A | 15 | — | 890 |

TABLE 2

| | ELECTRIC CHARACTERISTICS | | |
|---|---|---|---|
| | $\epsilon_r$ | Q | $\tau_f$ ppm/°C. |
| EXAMPLE | | | |
| 1 | 71.0 | 1510 | 13 |
| 2 | 76.0 | 1190 | 6 |
| 3 | 70.0 | 1120 | -5 |
| 4 | 68.0 | 910 | -8 |
| 5 | 65.0 | 660 | -22 |
| 6 | 74.0 | 1080 | 12 |
| 7 | 70.0 | 750 | -7 |
| 8 | 67.0 | 615 | -5 |
| 9 | 69.0 | 1305 | 8 |
| 10 | 69.5 | 1180 | -7 |
| 11 | 68.0 | 975 | 21 |
| 12 | 61.0 | 715 | -2 |
| 13 | 68.0 | 1060 | 18 |
| 14 | 64.0 | 1020 | 14 |
| 15 | 58.0 | 910 | 8 |
| 16 | 71.0 | 1120 | 16 |
| 17 | 62.0 | 1070 | -46 |
| 18 | 66.0 | 720 | -49 |
| 19 | 61.0 | 1100 | -30 |
| 20 | 63.0 | 1120 | -25 |
| 21 | 62.0 | 1090 | -32 |
| 22 | 61.0 | 1110 | -21 |
| COMPARATIVE EXAMPLE | | | |
| 1 | 44.0 | 150 | -1 |
| 2 | | NO RESONANCE | |
| 3 | 64.0 | 305 | 140 |
| 4 | 35.0 | 205 | 45 |
| 5 | 43.0 | 80 | -6 |
| 6 | 60.0 | 1510 | 86 |
| 7 | 41.0 | 260 | -31 |
| 8 | 87.0 | 2870 | 18 |
| 9 | 27.0 | 195 | -7 |
| 10 | 23.0 | 145 | 7 |
| 11 | 94.0 | 80 | 81 |
| 12 | 41.0 | 220 | -43 |

EXAMPLE 23

Barium carbonate powder (BaCO$_3$; 0.13 mole), titanium oxide powder (TiO$_2$; 0.70 mole) and neodymium oxide powder (Nd$_2$O$_3$; 0.17 mole) were charged in a ball mill together with ethanol and then subjected to wet blending for 12 hours. After the removal of the solvent from the dispersion, the mixture was pulverized and then calcined at 1250° C. in the air. Separately, glass powder A comprising 84wt % of lead oxide powder (Pbo), 7 wt % of zinc oxide powder (ZnO) and 9 wt % of boron oxide powder (B$_2$O$_3$) was prepared according to the usual method. To the calcined product prepared above, there were added 2 wt % of the glass powder A comprising PbO, ZnO and B$_2$O$_3$ as well as 3 wt % of germanium oxide powder (GeO$_2$) and 1 wt % (corresponding to 0.4 wt % as expressed in terms of the amount of Li$_2$O) of lithium carbonate powder (Li$_2$CO$_3$), followed by introduction of the mixture into a ball mill together with ethanol and then wet blending for 48 hours. After the removal of the solvent from the dispersion, the mixture was pulverized, followed by addition of an appropriate amount of a polyvinyl alcohol solution to the pulverized product, drying the mixture, forming it into pellets having a diameter of 12 mm and a thickness of 4 mm and then firing the pellets at 955° C. for 2 hours in the air. The composition of the product and the sintering temperature thereof are summarized in the following Table 3.

The ceramic composition thus prepared was inspected for various characteristic properties which were determined under the same conditions used in Example 1. The results thus obtained are listed in the following Table 5.

EXAMPLES 24 to 47 AND COMPARATIVE
EXAMPLES 13 to 28

The same procedures used in Example 23 were repeated except that the mixing ratio of barium carbonate, titanium oxide, neodymium oxide and samarium oxide; the kinds of glass powder as a minor component mainly comprising PbO, ZnO and B$_2$O$_3$ in the ratio listed in Table 4 and the added amounts of the minor components were changed as detailed in Table 3 to prepare dielectric ceramic compositions and they were inspected for characteristic properties. The results thus obtained are summarized in Table 5.

TABLE 3

COMPOSITION OF DIELECTRIC CERAMIC

| | BaO x | TiO$_2$ y | Nd$_2$O$_3$ z | Sm$_2$O$_3$ t | GLASS POWDER wt % | KIND OF GLASS | GeO$_2$ wt % | Li$_2$O wt % | CALCINATION TEMPERATURE °C. |
|---|---|---|---|---|---|---|---|---|---|
| EXAMPLE | | | | | | | | | |
| 23 | 0.13 | 0.70 | 0.17 | 0 | 2 | A | 3 | 0.4 | 955 |
| 24 | 0.18 | 0.67 | 0.11 | 0.04 | 7 | A | 3 | 0.2 | 930 |
| 25 | 0.18 | 0.67 | 0.11 | 0.04 | 10 | A | 3 | 0.2 | 900 |
| 26 | 0.18 | 0.67 | 0.11 | 0.04 | 15 | A | 3 | 0.2 | 885 |
| 27 | 0.16 | 0.67 | 0.11 | 0.06 | 20 | A | 2 | 0.4 | 855 |
| 28 | 0.18 | 0.66 | 0.13 | 0.03 | 5 | B | 5 | 0.4 | 970 |
| 29 | 0.17 | 0.67 | 0.10 | 0.06 | 10 | B | 3 | 0.8 | 940 |
| 30 | 0.16 | 0.65 | 0.17 | 0.02 | 15 | B | 3 | 0.4 | 910 |
| 31 | 0.13 | 0.70 | 0.17 | 0 | 7 | A | 3 | 0.4 | 930 |
| 32 | 0.13 | 0.70 | 0.15 | 0.02 | 7 | A | 3 | 0.4 | 925 |
| 33 | 0.13 | 0.70 | 0.12 | 0.05 | 7 | A | 3 | 0.4 | 925 |
| 34 | 0.14 | 0.71 | 0.04 | 0.11 | 10 | A | 5 | 0.2 | 930 |
| 35 | 0.17 | 0.66 | 0.17 | 0 | 10 | A | 5 | 0.2 | 915 |
| 36 | 0.17 | 0.66 | 0.17 | 0 | 10 | A | 7 | 0.2 | 910 |
| 37 | 0.17 | 0.66 | 0.17 | 0 | 10 | A | 10 | 0.2 | 930 |
| 38 | 0.16 | 0.65 | 0.18 | 0.01 | 7 | A | 3 | 0.2 | 935 |
| 39 | 0.16 | 0.65 | 0.18 | 0.01 | 7 | A | 3 | 0.4 | 915 |
| 40 | 0.16 | 0.65 | 0.18 | 0.01 | 7 | A | 3 | 0.6 | 905 |
| 41 | 0.16 | 0.65 | 0.18 | 0.01 | 7 | A | 3 | 0.8 | 885 |
| 42 | 0.15 | 0.67 | 0.18 | 0 | 10 | A | 5 | 0.4 | 880 |
| 43 | 0.15 | 0.67 | 0.18 | 0 | 15 | A | 3 | 0.4 | 850 |
| 44 | 0.17 | 0.66 | 0.17 | 0 | 20 | C | — | — | 950 |
| 45 | 0.16 | 0.67 | 0.17 | 0 | 18 | D | — | — | 940 |
| 46 | 0.16 | 0.67 | 0.17 | 0 | 20 | E | — | — | 940 |
| 47 | 0.16 | 0.66 | 0.18 | 0 | 17 | F | 5 | 0.3 | 850 |
| COMPARATIVE EXAMPLE | | | | | | | | | |
| 13 | 0.05 | 0.75 | 0.19 | 0.01 | 10 | A | 5 | 0.2 | 945 |
| 14 | 0.30 | 0.57 | 0.11 | 0.02 | 10 | A | 3 | 0.2 | 930 |
| 15 | 0.08 | 0.86 | 0.05 | 0.01 | 15 | A | 3 | 0.4 | 890 |
| 16 | 0.15 | 0.45 | 0.39 | 0.01 | 9 | A | 2 | 0.6 | 900 |
| 17 | 0.11 | 0.57 | 0.31 | 0.01 | 10 | A | 2 | 0.8 | 890 |
| 18 | 0.10 | 0.89 | 0 | 0.01 | 10 | A | 2 | 0.4 | 910 |
| 19 | 0.14 | 0.55 | 0.01 | 0.30 | 5 | A | 3 | 0.4 | 920 |
| 20 | 0.15 | 0.70 | 0.13 | 0.02 | 0 | — | 0 | 0 | 1420 |
| 21 | 0.16 | 0.67 | 0.11 | 0.06 | 30 | A | 2 | 0.4 | 840 |
| 22 | 0.16 | 0.65 | 0.17 | 0.02 | 30 | B | 3 | 0.4 | 835 |
| 23 | 0.17 | 0.66 | 0.17 | 0 | 20 | A | 0 | 0.2 | 1150 |
| 24 | 0.15 | 0.70 | 0.13 | 0.02 | 10 | A | 15 | 0.4 | 840 |
| 25 | 0.16 | 0.65 | 0.18 | 0.01 | 7 | A | 3 | 6.0 | 860 |
| 26 | 0.17 | 0.67 | 0.10 | 0.06 | 10 | B | 3 | 0 | 960 |
| 27 | 0.17 | 0.66 | 0.17 | 0 | 20 | G | — | — | 900 |
| 28 | 0.15 | 0.70 | 0.13 | 0.02 | 19 | H | — | — | 900 |

TABLE 4

| KIND OF GLASS | GLASS POWDER COMPOSITION (wt %) | | | | | SOFTENING POINT (°C.) |
|---|---|---|---|---|---|---|
| A | PbO (84) | ZnO (7) | B$_2$O$_3$ (9) | | | 315 |
| B | PbO (80) | ZnO (10) | B$_2$O$_3$ (10) | | | 310 |
| C | PbO (52) | ZnO (4) | B$_2$O$_3$ (6) | GeO$_2$ (31) | Li$_2$O (7) | 417 |
| D | PbO (56) | ZnO (5) | B$_2$O$_3$ (6) | GeO2 (33) | | 480 |
| E | PbO (51) | ZnO (4) | B$_2$O$_3$ (5) | GeO$_2$ (30) | Li$_2$O (6) Sb$_2$O$_3$ (4) | 442 |
| F | PbO (74) | ZnO (10) | B$_2$O$_3$ (9) | ZnO (7) | | 275 |
| G | B$_2$O$_3$ (35) | SiO$_2$ (45) | Al$_2$O$_3$ (10) | BaO (10) | | 650 |
| H | B$_2$O$_3$ (24) | SiO$_2$ (35) | BaO (41) | | | 690 |

TABLE 5

| | ELECTRIC CHARACTERISTICS | | |
|---|---|---|---|
| | $\epsilon_r$ | Q | $\tau_f$ ppm/°C. |
| EXAMPLE | | | |
| 23 | 75.0 | 1590 | 37 |
| 24 | 77.0 | 1260 | 21 |

TABLE 5-continued

| | ELECTRIC CHARACTERISTICS | | |
|---|---|---|---|
| | $\epsilon_r$ | Q | $\tau_f$ ppm/°C. |
| 25 | 72.0 | 1110 | 10 |
| 26 | 70.5 | 925 | 6 |
| 27 | 69.0 | 660 | 4 |
| 28 | 78.0 | 1105 | 37 |
| 29 | 72.0 | 790 | 32 |
| 30 | 71.0 | 620 | 23 |
| 31 | 74.0 | 1310 | 31 |
| 32 | 73.5 | 1250 | 17 |
| 33 | 72.0 | 1000 | −3 |
| 34 | 63.0 | 720 | −16 |
| 35 | 70.0 | 1090 | 32 |
| 36 | 66.0 | 1100 | 27 |
| 37 | 61.0 | 980 | 21 |
| 38 | 73.0 | 1180 | 33 |
| 39 | 75.0 | 1120 | 42 |
| 40 | 78.0 | 1090 | 47 |
| 41 | 74.0 | 820 | 54 |
| 42 | 66.0 | 1150 | −19 |
| 43 | 69.0 | 780 | −20 |
| 44 | 60.0 | 850 | 5 |
| 45 | 61.5 | 920 | −12 |
| 46 | 61.0 | 1000 | 16 |
| 47 | 68.0 | 1250 | −8 |
| COMPARATIVE EXAMPLE | | | |
| 13 | 47.0 | 160 | 14 |
| 14 | NO RESONANCE | | |
| 15 | 68.0 | 310 | 166 |
| 16 | 41.0 | 210 | 76 |
| 17 | 45.0 | 100 | 36 |
| 18 | 65.0 | 320 | 110 |
| 19 | 44.0 | 280 | −2 |
| 20 | 87.0 | 2870 | 18 |
| 21 | 31.0 | 210 | 19 |
| 22 | 26.0 | 160 | 31 |
| 23 | 96.0 | 100 | 85 |
| 24 | 43.0 | 250 | −19 |
| 25 | NO RESONANCE | | |
| 26 | 70.0 | 750 | −7 |
| 27 | NO SINTERING | | |
| 28 | NO SINTERING | | |

EXAMPLE 48

Barium carbonate powder ($BaCO_3$; 0.15 mole), titanium oxide powder ($TiO_2$; 0.675 mole), neodymium oxide powder ($Nd_2O_3$; 0.13 mole), samarium oxide powder ($Sm_2O_3$; 0.02 mole) and bismuth oxide powder ($Bi_2O_3$; 0.025 mole) were charged in a ball mill together with ethanol and then subjected to wet blending for 12 hours. After the removal of the solvent from the dispersion, the mixture was pulverized and then calcined at 1100° C. in the air. Separately, glass powder A comprising 84 wt % of lead oxide powder (PbO), 7 wt % of zinc oxide powder (ZnO) and 9 wt % of boron oxide powder ($B_2O_3$) was prepared according to the usual method. To the calcined product prepared above, there were added 2 wt % of the glass powder A comprising PbO, ZnO and $B_2O_3$, and 2 wt % of germanium oxide powder ($GeO_2$), followed by introducing the mixture into a ball mill together with ethanol and then wet blending for 12 hours. After the removal of the solvent from the dispersion, the mixture was pulverized, followed by addition of an appropriate amount of a polyvinyl alcohol solution to the pulverized product, drying the mixture, forming it into pellets having a diameter of 12 mm and a thickness of 4 mm and then firing the pellets at 1150° C. for 2 hours in the air. The composition of the product and the sintering temperature thereof are summarized in the following Table 6.

The ceramic composition thus prepared was inspected for various characteristic properties which were determined under the same conditions used in Example 23. The results thus obtained are listed in the following Table 6.

The ceramic composition thus prepared was processed into pieces each having a diameter of 7 mm and a thickness of about 3 mm and inspected for the specific dielectric constant $\epsilon_r$, the unloaded Q and the temperature coefficient $\tau_f$ of the resonance frequency at a resonance frequency (ranging from 3 to 5 GHz) according to the dielectric resonance method. The results thus obtained are listed in the following Table 7.

EXAMPLES 49 to 61 AND COMPARATIVE EXAMPLES 29 to 47

The same procedures used in Example 48 were repeated except that the mixing ratio of barium carbonate, titanium oxide, neodymium oxide, samarium oxide and bismuth oxide; the kinds and the added amount of glass powder comprising PbO, ZnO and $B_2O_3$ (glass powder B: 80 wt % PbO, 10 wt % ZnO and 10 wt% $B_2O_3$) and the added amounts of the minor component $GeO_2$ as well as the added amount (d) of the third component were changed as detailed in Table 6 to prepare dielectric ceramic compositions and they were inspected for characteristic properties in the same manner used in Example 48. The results thus obtained are summarized in Table 7.

TABLE 6

| | COMPOSITION OF DIELECTRIC CERAMIC | | | | | | | | | CALCINATION TEMPERATURE °C. |
|---|---|---|---|---|---|---|---|---|---|---|
| | BaO x | $TiO_2$ y | $Nd_2O_3$ z | $Sm_2O_3$ t | $Bi_2O_3$ w | GLASS POWDER wt % | KIND OF GLASS | $GeO_2$ wt % | d wt % | |
| EXAMPLE | | | | | | | | | | |
| 48 | 0.15 | 0.675 | 0.13 | 0.02 | 0.025 | 2 | A | 2 | | 1050 |
| 49 | 0.12 | 0.675 | 0.13 | 0.05 | 0.025 | 7 | A | 2 | — | 950 |
| 50 | 0.17 | 0.695 | 0.10 | 0.01 | 0.025 | 10 | A | 2 | — | 930 |
| 51 | 0.15 | 0.675 | 0.13 | 0.02 | 0.025 | 15 | A | 2 | — | 920 |
| 52 | 0.15 | 0.675 | 0.13 | 0.02 | 0.025 | 20 | A | 2 | — | 910 |
| 53 | 0.15 | 0.675 | 0.13 | 0.02 | 0.025 | 10 | A | 3 | — | 930 |
| 54 | 0.15 | 0.675 | 0.13 | 0.02 | 0.025 | 10 | A | 2 | 1 ($Nb_2O_5$) | 910 |
| 55 | 0.15 | 0.675 | 0.13 | 0.02 | 0.025 | 10 | A | 2 | 1 (MnO) | 920 |

TABLE 6-continued

| | COMPOSITION OF DIELECTRIC CERAMIC | | | | | | | | | |
|---|---|---|---|---|---|---|---|---|---|---|
| | BaO x | TiO$_2$ y | Nd$_2$O$_3$ z | Sm$_2$O$_3$ t | Bi$_2$O$_3$ w | GLASS POWDER wt % | KIND OF GLASS | GeO$_2$ wt % | d wt % | CALCINATION TEMPERATURE °C. |
| 56 | 0.15 | 0.675 | 0.13 | 0.02 | 0.025 | 10 | A | 2 | 1 (Al$_2$O$_3$) | 930 |
| 57 | 0.15 | 0.675 | 0.13 | 0.02 | 0.025 | 10 | A | 2 | 1 (ZnO) | 930 |
| 58 | 0.15 | 0.675 | 0.13 | 0.02 | 0.025 | 3 | B | 3 | — | 1050 |
| 59 | 0.12 | 0.675 | 0.13 | 0.05 | 0.025 | 8 | B | 2 | — | 950 |
| 60 | 0.17 | 0.695 | 0.10 | 0.01 | 0.025 | 11 | B | 2 | — | 940 |
| 61 | 0.15 | 0.675 | 0.13 | 0.02 | 0.025 | 15 | B | 5 | — | 920 |
| COMPARATIVE EXAMPLE | | | | | | | | | | |
| 29 | 0.05 | 0.75 | 0.18 | 0.01 | 0.01 | 10 | A | 5 | — | 960 |
| 30 | 0.30 | 0.57 | 0.10 | 0.02 | 0.01 | 8 | A | 2 | — | 920 |
| 31 | 0.08 | 0.85 | 0.05 | 0.01 | 0.01 | 15 | A | 3 | — | 900 |
| 32 | 0.15 | 0.45 | 0.37 | 0.01 | 0.02 | 9 | A | 2 | — | 920 |
| 33 | 0.11 | 0.57 | 0.30 | 0.01 | 0.01 | 10 | A | 2 | — | 930 |
| 34 | 0.15 | 0.81 | 0 | 0.01 | 0.03 | 10 | A | 2 | — | 920 |
| 35 | 0.15 | 0.675 | 0.15 | 0 | 0.025 | 8 | A | 2 | — | 910 |
| 36 | 0.12 | 0.545 | 0.01 | 0.30 | 0.025 | 5 | A | 2 | — | 990 |
| 37 | 0.15 | 0.675 | 0.155 | 0.02 | 0 | 8 | A | 3 | — | 1030 |
| 38 | 0.15 | 0.60 | 0.13 | 0.02 | 0.10 | 5 | A | 2 | — | 990 |
| 39 | 0.15 | 0.675 | 0.13 | 0.02 | 0.025 | 0 | — | 0 | — | 1350 |
| 40 | 0.15 | 0.675 | 0.13 | 0.02 | 0.025 | 30 | A | 2 | — | 870 |
| 41 | 0.15 | 0.675 | 0.13 | 0.02 | 0.025 | 30 | B | 2 | — | 890 |
| 42 | 0.15 | 0.675 | 0.13 | 0.02 | 0.025 | 8 | A | 0.1 | — | 1250 |
| 43 | 0.15 | 0.675 | 0.13 | 0.02 | 0.025 | 8 | A | 15 | — | 850 |
| 44 | 0.15 | 0.675 | 0.13 | 0.02 | 0.025 | 10 | A | 2 | 5 (Nb$_2$O$_5$) | 940 |
| 45 | 0.15 | 0.675 | 0.13 | 0.02 | 0.025 | 10 | A | 2 | 5 (MnO) | 900 |
| 46 | 0.15 | 0.675 | 0.13 | 0.02 | 0.025 | 10 | A | 2 | 5 (Al$_2$O$_3$) | 900 |
| 47 | 0.15 | 0.675 | 0.13 | 0.02 | 0.025 | 10 | A | 2 | 5 (ZnO) | 900 |

TABLE 7

| | ELECTRIC CHARACTERISTICS | | |
|---|---|---|---|
| | $\epsilon_r$ | Q | $\tau_f$ ppm/°C. |
| EXAMPLE | | | |
| 48 | 81.0 | 1150 | 7 |
| 49 | 74.0 | 930 | −22 |
| 50 | 77.0 | 800 | −12 |
| 51 | 77.0 | 1100 | −13 |
| 52 | 78.0 | 950 | −30 |
| 53 | 77.0 | 450 | −14 |
| 54 | 76.0 | 820 | −3 |
| 55 | 77.0 | 560 | 4 |
| 56 | 74.0 | 620 | 2 |
| 57 | 78.0 | 750 | −8 |
| 58 | 80.0 | 1050 | 7 |
| 59 | 73.0 | 890 | −21 |
| 60 | 74.0 | 720 | −11 |
| 61 | 73.0 | 630 | −17 |
| COMPARATIVE EXAMPLE | | | |
| 29 | 51.0 | 120 | −12 |
| 30 | NO RESONANCE | | |
| 31 | 70.0 | 400 | 130 |
| 32 | 41.0 | 170 | 33 |
| 33 | 49.0 | 80 | −15 |
| 34 | 43.0 | 130 | −35 |
| 35 | 80.0 | 130 | −26 |
| 36 | 46.0 | 240 | −38 |
| 37 | 79.0 | 1050 | 33 |
| 38 | 41.0 | 200 | 33 |
| 39 | 93.0 | 1200 | 5 |
| 40 | 33.0 | 180 | −7 |
| 41 | 29.0 | 150 | −5 |
| 42 | 85.0 | 1100 | −33 |
| 43 | 45.0 | 200 | −55 |
| 44 | 74.0 | 210 | 25 |
| 45 | 77.0 | 250 | 33 |
| 46 | 72.0 | 220 | 27 |
| 47 | 71.0 | 240 | 22 |

EXAMPLE 62

Barium carbonate powder (BaCO$_3$; 0.13 mole), titanium oxide powder (TiO$_2$; 0.69 mole), neodymium oxide powder (Nd$_2$O$_3$; 0.16 mole) and bismuth oxide powder (Bi$_2$O$_3$; 0.02 mole) were charged in a ball mill together with ethanol and then subjected to wet blending for 12 hours. After the removal of the solvent from the dispersion, the mixture was pulverized and then calcined at 1250° C. in the air. Separately, glass powder A comprising 84wt % of lead oxide powder (PbO), 7 wt % of zinc oxide powder (ZnO) and 9 wt % of boron oxide powder (B$_2$O$_3$) was prepared according to the usual method. To the calcined product prepared above, there were added 2 wt % of the glass powder A comprising PbO, ZnO and $B_2O_3$, 3 wt % of germanium oxide powder ($GeO_2$) and 1 wt % (corresponding to 0.4 wt % as expressed in terms of the weight of $Li_2O$) of lithium carbonate powder ($Li_2CO_3$), followed by introduction of the mixture into a ball mill together with ethanol and then wet blending for 48 hours. After the removal of the solvent from the dispersion, the mixture was pulverized, followed by addition of an appropriate amount of a polyvinyl alcohol solution to the pulverized product, drying the mixture, forming it into pellets having a diameter of 12 mm and a thickness of 4 mm and then firing the pellets at 945° C. for 2 hours in the air. The composition of the product and the sintering temperature thereof are summarized in the following Table 8.

EXAMPLES 63 to 82 AND COMPARATIVE EXAMPLES 48 to 62

The same procedures used in Example 62 were repeated except that the mixing ratio of barium carbonate, titanium oxide, neodymium oxide, samarium oxide and bismuth oxide; the kinds of glass powder comprising PbO, ZnO and $B_2O_3$ (glass powder B: 80 wt % PbO, 10 wt % ZnO and 10 wt % $B_2O_3$) and the added amounts of the minor components were changed as detailed in Table 8 to prepare dielectric ceramic compositions and they were inspected for characteristic properties. The results thus obtained are summarized in Table 9.

TABLE 8

| | COMPOSITION OF DIELECTRIC CERAMIC | | | | | | | | | |
|---|---|---|---|---|---|---|---|---|---|---|
| | BaO x | $TiO_2$ y | $Nd_2O_3$ z | $Sm_2O_3$ t | $Bi_2O_3$ w | GLASS POWDER wt % | KIND OF GLASS | $GeO_2$ wt % | $Li_2O$ wt % | CALCINATION TEMPERATURE °C. |
| EXAMPLE | | | | | | | | | | |
| 62 | 0.13 | 0.69 | 0.16 | 0 | 0.02 | 2 | A | 3 | 0.4 | 945 |
| 63 | 0.17 | 0.66 | 0.11 | 0.04 | 0.02 | 7 | A | 3 | 0.2 | 920 |
| 64 | 0.17 | 0.66 | 0.10 | 0.04 | 0.03 | 10 | A | 3 | 0.2 | 890 |
| 65 | 0.18 | 0.66 | 0.11 | 0.04 | 0.01 | 15 | A | 3 | 0.2 | 880 |
| 66 | 0.15 | 0.67 | 0.10 | 0.06 | 0.02 | 20 | A | 2 | 0.4 | 860 |
| 67 | 0.17 | 0.66 | 0.12 | 0.03 | 0.02 | 5 | B | 5 | 0.4 | 960 |
| 68 | 0.17 | 0.66 | 0.10 | 0.06 | 0.01 | 10 | B | 3 | 0.8 | 920 |
| 69 | 0.16 | 0.64 | 0.16 | 0.02 | 0.02 | 15 | B | 3 | 0.4 | 900 |
| 70 | 0.13 | 0.69 | 0.16 | 0 | 0.02 | 7 | A | 3 | 0.4 | 920 |
| 71 | 0.12 | 0.70 | 0.14 | 0.02 | 0.02 | 7 | A | 3 | 0.4 | 920 |
| 72 | 0.13 | 0.69 | 0.11 | 0.05 | 0.02 | 7 | A | 3 | 0.4 | 920 |
| 73 | 0.14 | 0.70 | 0.04 | 0.10 | 0.02 | 10 | A | 5 | 0.2 | 920 |
| 74 | 0.17 | 0.66 | 0.16 | 0 | 0.01 | 10 | A | 5 | 0.2 | 900 |
| 75 | 0.16 | 0.66 | 0.16 | 0 | 0.02 | 10 | A | 7 | 0.2 | 915 |
| 76 | 0.16 | 0.66 | 0.16 | 0 | 0.02 | 10 | A | 10 | 0.2 | 920 |
| 77 | 0.15 | 0.65 | 0.17 | 0.01 | 0.02 | 7 | A | 3 | 0.2 | 925 |
| 78 | 0.15 | 0.65 | 0.17 | 0.01 | 0.02 | 7 | A | 3 | 0.4 | 905 |
| 79 | 0.15 | 0.65 | 0.17 | 0.01 | 0.02 | 7 | A | 3 | 0.6 | 900 |
| 80 | 0.15 | 0.65 | 0.17 | 0.01 | 0.02 | 7 | A | 3 | 0.8 | 875 |
| 81 | 0.14 | 0.67 | 0.17 | 0 | 0.02 | 10 | A | 5. | 0.4 | 860 |
| 82 | 0.14 | 0.67 | 0.17 | 0 | 0.02 | 15 | A | 3 | 0.4 | 845 |
| COMPARATIVE EXAMPLE | | | | | | | | | | |
| 48 | 0.05 | 0.75 | 0.18 | 0.01 | 0.01 | 10 | A | 5 | 0.2 | 935 |
| 49 | 0.30 | 0.57 | 0.10 | 0.02 | 0.01 | 10 | A | 3 | 0.2 | 920 |
| 50 | 0.08 | 0.86 | 0.04 | 0.01 | 0.01 | 15 | A | 3 | 0.4 | 880 |
| 51 | 0.14 | 0.45 | 0.38 | 0.01 | 0.02 | 9 | A | 2 | 0.6 | 890 |
| 52 | 0.11 | 0.56 | 0.31 | 0.01 | 0.01 | 10 | A | 2 | 0.8 | 885 |
| 53 | 0.10 | 0.87 | 0 | 0.01 | 0.02 | 10 | A | 2 | 0.4 | 905 |
| 54 | 0.13 | 0.55 | 0.01 | 0.30 | 0.01 | 5 | A | 3 | 0.4 | 915 |
| 55 | 0.18 | 0.67 | 0.14 | 0.01 | 0 | 2 | A | 2 | 1.5 | 955 |
| 56 | 0.20 | 0.64 | 0.05 | 0.01 | 0.1 | 7 | A | 3 | 0.4 | 910 |
| 57 | 0.14 | 0.69 | 0.13 | 0.02 | 0.02 | 0 | — | 0 | 0 | 1400 |
| 58 | 0.15 | 0.67 | 0.11 | 0.06 | 0.01 | 30 | A | 2 | 0.4 | 850 |
| 59 | 0.15 | 0.65 | 0.16 | 0.02 | 0.02 | 30 | B | 3 | 0.4 | 820 |
| 60 | 0.16 | 0.66 | 0.16 | 0 | 0.02 | 20 | A | 0 | 0.2 | 1130 |
| 61 | 0.14 | 0.70 | 0.13 | 0.02 | 0.01 | 10 | A | 15 | 0.4 | 835 |
| 62 | 0.16 | 0.65 | 0.17 | 0.01 | 0.01 | 7 | A | 3 | 6.0 | 855 |
| 63 | 0.16 | 0.67 | 0.10 | 0.06 | 0.01 | 10 | B | 3 | 0 | 950 |

The ceramic composition thus prepared was processed into pieces each having a diameter of 7 mm and a thickness of about 3 mm and inspected for the specific dielectric constant $\epsilon_r$, the unloaded Q and the temperature coefficient $\tau_f$ of the resonance frequency at a resonance frequency (ranging from 3 to 6 GHz) according to the dielectric resonance method. The results thus obtained are listed in the following Table 9.

TABLE 9

| | ELECTRIC CHARACTERISTICS | | |
|---|---|---|---|
| | $\epsilon_r$ | Q | $\tau_f$ ppm/°C. |
| EXAMPLE | | | |
| 62 | 76.0 | 1450 | 35 |

TABLE 9-continued

| | ELECTRIC CHARACTERISTICS | | |
|---|---|---|---|
| | $\epsilon_r$ | Q | $\tau_f$ ppm/°C. |
| 63 | 78.0 | 1160 | 18 |
| 64 | 73.0 | 1110 | 5 |
| 65 | 71.0 | 900 | 4 |
| 66 | 70.0 | 640 | 2 |
| 67 | 79.0 | 1050 | 35 |
| 68 | 73.0 | 760 | 29 |
| 69 | 81.0 | 1200 | 73 |
| 70 | 75.0 | 1250 | 29 |
| 71 | 74.0 | 1050 | 15 |
| 72 | 73.0 | 990 | −5 |
| 73 | 64.0 | 730 | −18 |
| 74 | 71.0 | 1100 | 30 |
| 75 | 67.0 | 1050 | 25 |
| 76 | 62.0 | 950 | 19 |
| 77 | 74.0 | 1080 | 30 |
| 78 | 76.0 | 1020 | 40 |
| 79 | 79.0 | 1050 | 43 |
| 80 | 75.0 | 800 | 50 |
| 81 | 68.0 | 1100 | −22 |
| 82 | 70.0 | 790 | −22 |
| COMPARATIVE EXAMPLE | | | |
| 48 | 49.0 | 170 | 13 |
| 49 | | NO RESONANCE | |
| 50 | 69.0 | 300 | 150 |
| 51 | 43.0 | 190 | 72 |
| 52 | 47.0 | 90 | 30 |
| 53 | 66.0 | 350 | 105 |
| 54 | 47.0 | 310 | −5 |
| 55 | 60.0 | 390 | 47 |
| 56 | 47.0 | 180 | −15 |
| 57 | 88.0 | 2770 | 15 |
| 58 | 35.0 | 240 | 23 |
| 59 | 29.0 | 170 | 29 |
| 60 | 97.0 | 120 | 75 |
| 61 | 45.0 | 230 | −22 |
| 62 | | NO RESONANCE | |
| 63 | 71.0 | 650 | −10 |

As has been discussed above in detail, the dielectric ceramic composition of the present invention exhibits excellent characteristic properties in that it has a large specific dielectric constant $\epsilon_r$, a large unloaded Q and a small temperature coefficient of the resonance frequency and the composition is advantageous in that it can be sintered at a low temperature and that it can easily be laminated together with, for instance, an Ag, Ag-Pd or Cu internal electrode.

What is claimed is:

1. A dielectric ceramic composition mainly comprising a major component which comprises barium, titanium, neodymium, samarium and oxygen and is represented by the following compositional formula:

$$xBaO\text{-}yTiO_2\text{-}zNd_2O_3\text{-}tSm_2O_3 \quad (1)$$

(wherein $0.1 \leq x \leq 0.2$; $0.5 \leq y \leq 0.8$; $0.01 \leq z \leq 0.2$; $0 \leq t \leq 0.2$, provided that $x+y+z+t=1$); and a minor component mainly comprised of glass powder and $GeO_2$, said glass powder comprising PbO, ZnO, and $B_2O_3$ and present within a range of 1–25% by weight, said $GeO_2$ present in a range of 0.5–10% by weight based on the weight of the major component.

2. The dielectric ceramic composition of claim 1 wherein the minor component is further comprised of 0.04–4% by weight, based on the weight of the major component, of LiO.

3. The dielectric ceramic composition of claim 1 which further comprises at least one member selected from the group consisting of $Nb_2O_5$, MnO, $Al_2O_3$ and ZnO present in the range of 0.1 to 2% on the basis of the weight of the major component.

4. The dielectric ceramic composition of claim 1 wherein the glass powder comprises 5–90% by weight PbO, greater than 0 but less the 65% by weight ZnO, and 5–60% by weight $B_2O_3$, all based on the weight of the glass powder.

5. The dielectric ceramic composition of claim 4 wherein the glass powder has a softening point of about 100° C. to about 500° C.

6. A dielectric ceramic composition mainly comprising a major component which comprises barium, titanium, neodymium, samarium, bismuth and oxygen and is represented by the following compositional formula:

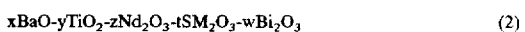

$$xBaO\text{-}yTiO_2\text{-}zNd_2O_3\text{-}tSM_2O_3\text{-}wBi_2O_3 \quad (2)$$

(wherein $0.1 \leq x \leq 0.2$; $0.5 \leq y \leq 0.8$; $0.01 \leq z \leq 0.2$; $0 \leq t \leq 0.2$, provided that $x+y+z+t=1$); and a minor component mainly comprised of glass powder and $GeO_2$, said glass powder comprising PbO, ZnO, and $B_2O_3$ and present within a range of 1–25% by weight, said $GeO_2$ present in a range of 0.5–10% by weight based on the weight of the major component.

7. The dielectric ceramic composition of claim 6 wherein the minor component is further comprised of 0.04–4% by weight of $Li_2O$ based on the weight of the major component.

8. The dielectric ceramic composition of claim 6 which further comprises at least one member selected from the group consisting of $Nb_2O^5$, MnO, $Al_2O_3$ and ZnO present in the range of 0.1 to 2% on the basis of the weight of the major component.

9. The dielectric ceramic composition of claim 6 wherein the glass powder comprises 5–90% by weight PbO, greater than 0 but less the 65% by weight ZnO, and 5–60% by weight $B_2O_3$, all based on the weight of the glass powder.

10. The dielectric ceramic composition of claim 9 wherein the glass powder has a softening point of about 100° C. to about 500° C.

11. A dielectric device comprising a dielectric ceramic composition which mainly comprises a major component comprising barium, titanium, neodymium, samarium and oxygen and represented by the following compositional formula:

$$xBaO\text{-}yTiO_2\text{-}zNd_2O_3\text{-}tSm_2O_3 \quad (1)$$

(wherein $0.1 \leq x \leq 0.2$; $0.5 \leq y \leq 0.8$; $0.01 \leq z \leq 0.2$; $0 \leq t \leq 0.2$, provided that $x+y+z+t=1$);

a minor component mainly comprised of glass powder and $GeO_2$, said glass powder comprising PbO, ZnO, and $B_2O_3$ and present within a range of 1–25% by weight, said $GeO_2$ present in a range of 0.5–10% by weight based on the weight of the major component.

12. The dielectric device of claim 11 wherein the minor component of the dielectric ceramic composition further comprises $Li_2O$ present within the range of 0.04–4% by weight, based on the weight of the major component.

13. The dielectric device of claim 11 wherein the glass powder comprises 5–90% by weight PbO, greater than 0 but less the 65% by weight ZnO, and 5–60% by weight $B_2O_3$, all based on the weight of the glass powder.

14. The dielectric device of claim 12 wherein the glass powder has a softening point of about 100° C. to about 500° C.

15. A dielectric device comprising a dielectric ceramic composition which mainly comprises a major component comprising barium, titanium, neodymium, samarium, bismuth and oxygen and represented by the following compositional formula:

$$xBaO\text{-}yTiO_2\text{-}zNd_2O_3\text{-}tSM_2O_3\text{-}wBi_2O_3 \qquad (2)$$

(wherein $0.1 \leq x \leq 0.2$; $0.5 \leq y \leq 0.8$; $0.01 \leq z \leq 0.2$; $0 \leq t \leq 0.2$, provided that $x+y+z+t=1$); and a minor component mainly comprised of a glass powder and $GeO_2$, said glass powder comprising PbO, ZnO, and $B_2O_3$ and present within a range of 1–25% by weight, said $GeO_2$ present in a range of 0.5–10% by weight based on the weight of the major component.

16. The dielectric device of claim 14 wherein the minor component of the dielectric ceramic composition further comprises $Li_2O$ within the range of 0.04–4% by weight, based on the weight of the major component.

17. The dielectric device of claim 15 wherein the glass powder comprises 5–90% by weight PbO, greater than 0 but less the 65% by weight ZnO, and 5–60% by weight $B_2O_3$, all based on the weight of the glass powder.

18. The dielectric device of claim 16 wherein glass powder has a the softening point of about 100° C. to about 500° C.

* * * * *